Oct. 3, 1961   R. BUECHTING   3,002,544
RIB LOCK WASHER
Filed June 20, 1958
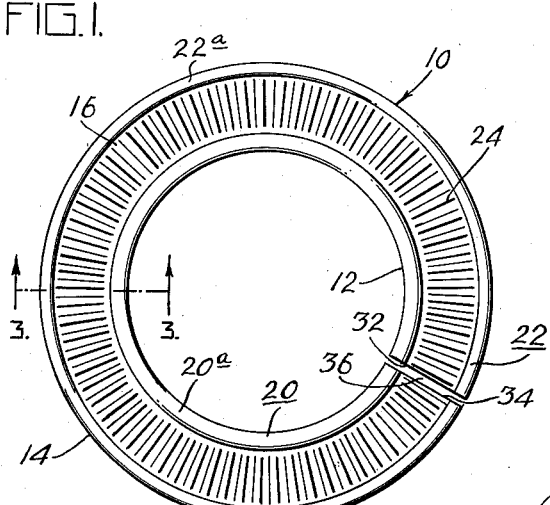
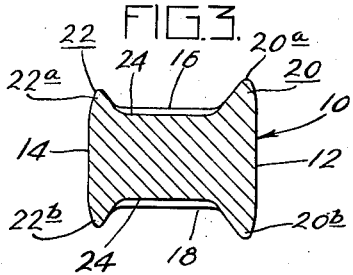
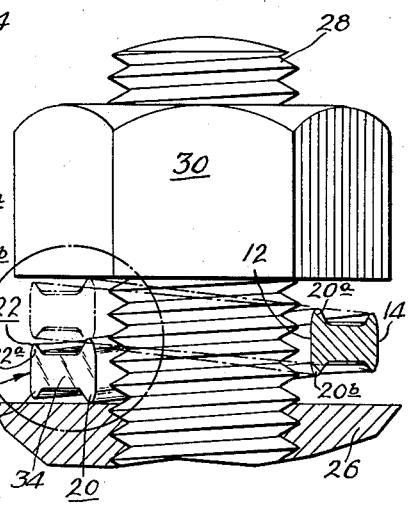
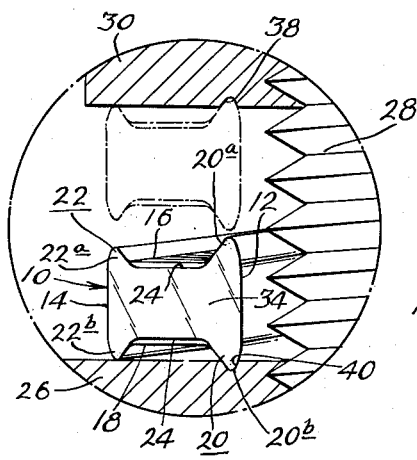
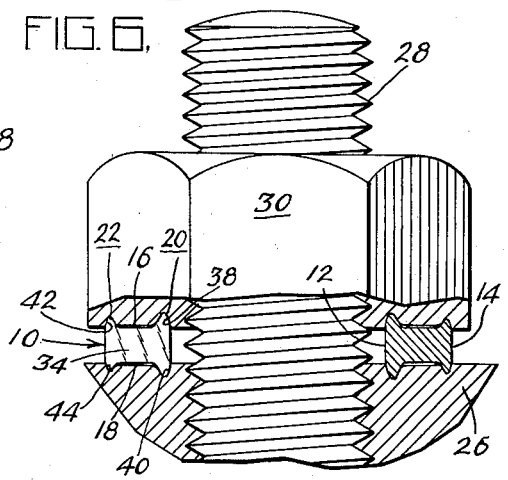
INVENTOR:
RUDOLPH BUECHTING
BY Howson & Howson
ATTYS.

United States Patent Office 3,002,544
Patented Oct. 3, 1961

3,002,544
RIB LOCK WASHER
Rudolph Buechting, Glenside, Pa., assignor to Philadelphia Steel and Wire Corporation, Philadelphia, Pa., a corporation of Pennsylvania
Filed June 20, 1958, Ser. No. 743,242
1 Claim. (Cl. 151—36)

The present invention relates to an improved spring lock washer of a type specifically adapted to be free from any tendency to radial spread, and having increased effectiveness in providing reactive tension across the full width of the cross section, and added resistance to backward movement of a nut.

Heretofore, various types of spring lock washers have been provided, some of which included means adapted to prevent spreading and others of which had configurations adapted to increase the holding power and have added resistance to backward movement of a nut with which it is engaged.

Attempts have been made to utilize peripheral ribs on one or both sides of the washer, usually on the inner periphery, adapted to form a groove in a nut and backing to prevent the washer from spreading. Such constructions however, did not make contact across the width of the section outside the ribs and under some conditions, and in extreme circumstances, did not prevent spreading and as a matter of fact acted in a positive manner to cause spreading due to a thickening of end portions during severing of the individual washers from a helical coil from which formed.

Attempts have also been made to utilize four ribs projecting from both faces of the washers, along the inner and outer periphery of the washer, but these ribs were of the same height with serrated surfaces thereon. It has been found that constructions of this nature act like flat surface washers which have been thickened during severing, and cause a spreading action while biting into the nut and backing material.

It is an object of the present invention to provide a helical spring lock washer which overcomes the failures and drawbacks of previously known constructions, and which very effectively provides reactive tension across the full width of the cross section such as obtained with a conventional flat lock washer, and additionally providing means resulting in added resistance to spreading and backward movement of the nut.

Additional objects, advantages and features of the present invention will be more readily apparent from the following detailed discussion of an embodiment thereof when taken together with the accompanying drawings in which:

FIG. 1 is a plan view of the washer of the present invention;

FIG. 2 is an elevational view of the washer of FIG. 1;

FIG. 3 is a sectional view taken on line 3—3 of FIG. 1;

FIG. 4 is an enlarged fragmentary elevational view of an assembly incorporating the present lock washer before tightening thereof;

FIG. 5 is an enlarged detailed view of the portion encircled in FIG. 4; and

FIG. 6 is a view similar to FIG. 4 after tightening of the assembly.

Referring now more particularly to the drawing, the lock washer of the present invention generally designated 10, consists of a helical segment of approximately 360° and includes inner and outer peripheral faces 12 and 14 respectively. Upper and lower axial faces 16 and 18 are also provided in the usual manner.

In accordance with the teachings of the present invention a raised rib 20 is provided on the inner periphery of the washer projecting axially outwardly from the upper and lower axial faces 16 and 18. The upper rib is designated 20a and the lower rib 20b. It will be seen by reference to the drawings that these peripheral ribs have a substantially pointed or sharpened configuration for purposes hereinafter to be set forth. An outer raised rib 22 is provided on the outer periphery of the lock washer and includes a portion 22a projecting axially beyond the face 16 and a portion 22b projecting axially beyond the face 18. These ribs are also of a pointed or sharpened configuration as shown in the drawings.

The faces 16 and 18 can be provided with serrations between the spaced ribs as shown at 24 if desired, although this is not necessary. When serrations are provided it can be expected to increase the holding power of the lock washer as well as resistance to backward movement of the nut by up to approximately 20%. The end use to which the washer is to be put can govern the use or omission of these serrations.

As shown in the drawings, the inner rib 20 is of greater height than the outer rib 22. The exact relationship of heights of the ribs can be varied, and is governed by the end use and materials used to give proper prevention of spreading. The washer is so designed and dimensioned that in operation or use the inner rib will have the function of initially grooving the material of the backing and nut to prevent spread of the washer, and upon subsequent tightening the outer rib will give contact across the width of the washer to increase resistance to turning, and subsequently upon further tightening of a nut or the like, this outer rib will also groove into the material of the nut and backing to additionally prevent spreading.

This action of the present washer can be more readily understood by reference to FIGS. 4-6 inclusive. As shown in these drawings a backing or article to be fastened 26, has a bolt 28 extending therethrough. A nut 30 is engaged with the threads on the bolt 28. Intermediate of the backing 26 and nut 30 is interposed a lock washer 10. In FIG. 4 of the drawings the nut 30 has merely been brought into engagement with the axial extremities of the lock washer 10, which as in usual constructions has axially spaced ends 32 and 34 with a gap therebetween as at 36.

Due to the difference in height of the inner rib 20 with respect to the outer rib 22, the inner rib 20 will be first engaged by the undersurface of the nut 30 and the upper surface of the backing 26 as shown in FIG. 4. Upon initial tightening of the nut, following the position of FIG. 4, the extremities of the ribs 20a and 20b at the faces 32 and 34 will commence to form a groove at 38 in the material of the nut and at 40 in the backing as shown in FIG. 5 of the drawings. This initial grooving by the inner ribs will prevent spreading of the washer under continued tightening thereof. As the nut is further tightened on the bolt, the inner groove will be deepened until ultimately the ribs 22a and 22b have made contact with the face of the nut as well as the backing, thus providing reactive tension across the full width of the cross section as shown in FIG. 6. These outer ribs will also press a groove 42 into the nut and groove 44 into the backing, thus providing added resistance to spreading and backward movement of the nut.

It will therefore be apparent that the over-all height of the ribs on the inner periphery are made greater than that of the outer ribs for the specific purpose of accomplishing the forming of the grooves on the inner periphery to avoid spreading, and subsequent further tightening will allow the outer ribs to perform their function as outlined. In the fully tightened condition, the serrations 24 will engage in the material of the backing and nut with a consequent increased holding power.

Under some circumstances and for some applications it may be desirable to have the inner and outer peripheral ribs on one face only of the washer. In such a construction the two spaced ribs on the one face would perform in the same function by forming grooves in the surface contacted by the ribs.

The construction and operation of the present lock washer will be apparent from the foregoing, but manifestly minor changes in details of construction can be effected without departing from the spirit and scope of the invention as defined in the appended claim.

I claim:

A split spring lock washer comprising a helical segment of substantially 360°, substantially flat axially directed faces of substantial width on said segment, said segment having inner and outer curvilinear peripheries substantially perpendicular to said axially directed faces, and substantially pointed ribs of tapered cross-section spacedly projecting from each said axially directed face at both inner and outer said peripheries at the extremities of said flat axially directed faces, the inner one of said ribs having a greater height than that of the outer one of said ribs, and said flat axially directed faces being serrated intermediate said inner and outer ribs.

References Cited in the file of this patent

UNITED STATES PATENTS

| | | |
|---|---|---|
| 985,772 | Beers | Mar. 7, 1911 |
| 1,999,082 | Buechting | Apr. 23, 1935 |
| 2,014,995 | Washer | Sept. 17, 1935 |